United States Patent
Rajauria

(10) Patent No.: US 9,601,140 B1
(45) Date of Patent: Mar. 21, 2017

(54) IN-SITU SMEAR DETECTION AND MITIGATION IN HEAT-ASSISTED MAGNETIC RECORDING HEAD-DISK INTERFACE

(71) Applicant: HGST Netherlands B.V., Amsterdam (NL)

(72) Inventor: Sukumar Rajauria, San Jose, CA (US)

(73) Assignee: Western Digital Technologies, Inc, Irvine, CA (US)

( * ) Notice: Subject to any disclaimer, the term of this patent is extended or adjusted under 35 U.S.C. 154(b) by 0 days.

(21) Appl. No.: 15/160,945

(22) Filed: May 20, 2016

(51) Int. Cl.
G11B 21/02 (2006.01)
G11B 5/40 (2006.01)
G11B 5/455 (2006.01)
G11B 5/60 (2006.01)
G11B 5/00 (2006.01)

(52) U.S. Cl.
CPC ........... *G11B 5/40* (2013.01); *G11B 5/455* (2013.01); *G11B 5/607* (2013.01); *G11B 2005/0021* (2013.01)

(58) Field of Classification Search
CPC ....... G11B 5/012; G11B 27/36; G11B 5/6005; G11B 5/59633; G11B 5/54; G11B 33/08; G11B 25/043; G11B 5/40; G11B 2005/0021; G11B 2005/0005; G11B 5/4907
USPC ........ 360/31, 75, 77.17, 97.19, 313, 59, 328
See application file for complete search history.

(56) References Cited

U.S. PATENT DOCUMENTS

| | | | |
|---|---|---|---|
| 5,436,776 A | 7/1995 | Kurokawa | |
| 6,577,575 B2 * | 6/2003 | Novotny | B82Y 10/00 369/13.33 |
| 7,026,823 B2 | 4/2006 | Takanuki et al. | |
| 7,764,468 B2 | 7/2010 | Sawada et al. | |
| 8,169,754 B2 | 5/2012 | Druist et al. | |
| 8,654,618 B1 | 2/2014 | Liu et al. | |
| 8,885,287 B1 | 11/2014 | Koike et al. | |
| 9,123,387 B1 | 9/2015 | Novotny et al. | |
| 2011/0299367 A1 | 12/2011 | Naniwa et al. | |

OTHER PUBLICATIONS

Sukumar Rajauria, Tunable Contact Detection Sensitivity to Directly Measure Clearance of Protrusions in Magnetic Recording Heads, U.S. Appl. No. 14/823,775, filed Aug. 11, 2015.

* cited by examiner

*Primary Examiner* — Nabil Hindi
(74) *Attorney, Agent, or Firm* — John D. Henkhaus

(57) ABSTRACT

A procedure for detecting the presence of contamination at a head-disk interface in a heat- assisted magnetic recording (HAMR) hard disk drive involves flying a head slider over a magnetic-recording disk at a particular fly height, applying an oscillating signal to a heat source associated with a HAMR near-field transducer (NFT) that is located in the slider to dither the spacing between the NFT and the disk, and determining, based on change to a contact detection signal, that contamination has accumulated on the slider, generally, or on the NFT, specifically. Burnishing the contamination from the slider may then be performed, by bringing the slider into contact with the disk.

20 Claims, 3 Drawing Sheets

IN-SITU SMEAR DETECTION AND MITIGATION IN HEAT-ASSISTED MAGNETIC RECORDING HEAD-DISK INTERFACE

FIELD OF EMBODIMENTS

Embodiments of the invention may relate generally to hard disk drives and more particularly to dithering of the head-disk interface to detect smear.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read- write head uses a magnetic field to read data from and write data to the surface of a magnetic-recording disk. A write head makes use of the electricity flowing through a coil, which produces a agnetic field. Electrical pulses are sent to the write head, with different patterns of positive and negative currents. The current in the coil of the write head induces a magnetic field across the gap between the head and the magnetic disk, which in turn magnetizes a small area on the magneticrecording disk medium.

Increasing areal density (a measure of the quantity of information bits that can be stored on a given area of disk surface) is one of the ever-present goals of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat-Assisted Magnetic Recording

Heat-assisted magnetic recording (HAMR) [which may also be referred to as energy-assisted magnetic recording (EAMR) or thermal-assisted magnetic recording (TAR)] is a known technology that magnetically records data on high-stability media using, for example, laser thermal assistance to first heat the media material. HAMR takes advantage of high-stability, high-coercivity magnetic compounds, such as iron platinum alloy, which can store single bits in a much smaller area without being limited by the same superparamagnetic effect that limits the current technology used in hard disk drive storage. However, at some capacity point the bit size is so small, and the coercivity correspondingly so high, that the magnetic field used for writing data cannot be made strong enough to permanently affect the data and, therefore, data can no longer be written to the medium. HAMR solves this problem by temporarily and locally changing the coercivity of the magnetic-recording medium by raising the temperature above the Curie temperature (-600° C.), at which the medium effectively loses coercivity, and a realistically achievable magnetic write field can write data to the medium.

One approach to HAMR designs is to utilize a semiconductor laser system to heat the medium to lower its coercivity, whereby the optical energy is transported from the laser to the slider ABS via a waveguide and is concentrated to a nanometer-sized spot utilizing a near-field transducer (NFT). More detailed information about the structure and functionality of a thermally assisted magnetic write head employing an NFT can be found in U.S. Pat. No. 8,351,151 to Katine et al., the entire content of which is incorporated by reference in its entirety for all purposes as if fully set forth herein.

For example, a HAMR head slider may comprise a waveguide configured to guide optical energy from the laser through the head slider to the NFT, which is positioned near the write head. For a non-limiting example, the NFT may utilize a metal optical device such as an E-antenna (or a triangular antenna) which, when illuminated by light, excites a charge oscillation called a plasmon within the antenna. The charges concentrated at the edge of the antenna generate a localized higher intensity optical near-field. The optical near-field is electromagnetically coupled to the magnetic-recording medium, locally creating a high frequency current. The resistive losses associated with this current are converted to heat, raising the local temperature in the medium. The thermal and mechanical reliability of the NFT reaching such extreme temperatures is of utmost importance.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed to a procedure for detecting the presence of contamination (or "smear") at a head-disk interface (HDI) in a heat-assisted magnetic recording (HAMR) hard disk drive (HDD), and to electronic hardware for the same. Such a procedure may comprise flying a head slider over a magnetic-recording disk at a particular fly height, applying an oscillating signal to a heat source associated with a HAMR near-field transducer (NFT) that is located in the slider to dither the spacing between the NFT and the disk, and determining, based on change to a contact detection signal, that contamination has accumulated on the slider, generally, or on the NFT, specifically. Because the part of the NFT that changes shape in response to applying the oscillating signal to the heat source is on the order of a few hundred nanometers by a few hundred nanometers, the determining action likewise may have a precision on the same order of a few hundred nanometers. Embodiments may include burnishing the contamination from the slider, such as by bringing the slider into contact with the disk.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a procedure for detecting contamination at a head-disk interface (HDI) in a hard disk drive (HDD) are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Desription of Illustrative Operating Environments

Embodiments may be used in the context of detecting contamination at a head-disk interface (HDI) in a hard disk drive (HDD). Thus, in accordance with an embodiment, a plan view illustrating an HDD 100 is shown in FIG. 1 to illustrate an exemplary operating environment.

Figure 1:
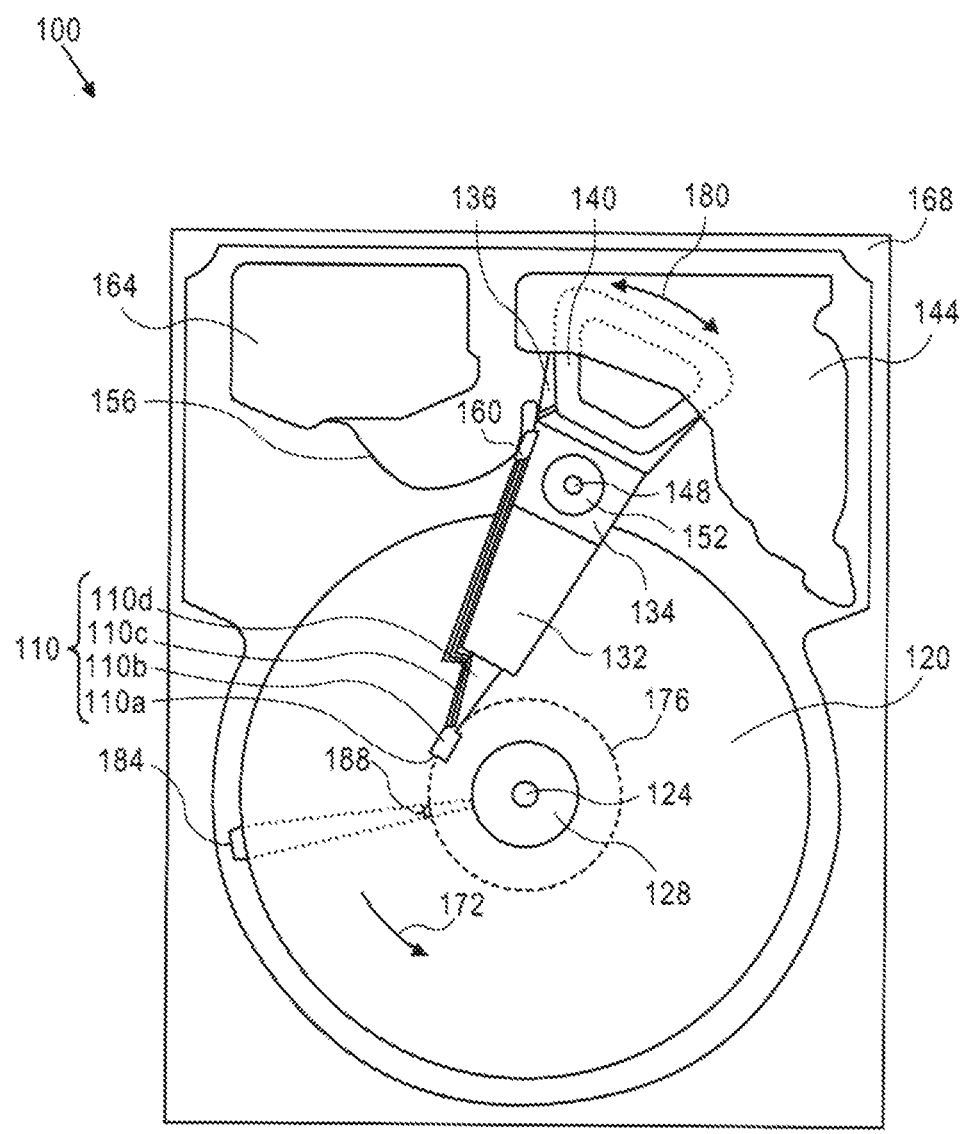
FIG. 1 is a plan view illustrating a hard disk drive (HDD), according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable"). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Heat-Assisted Magnetic Recording Head Near-Field Transducer

Figure 2:
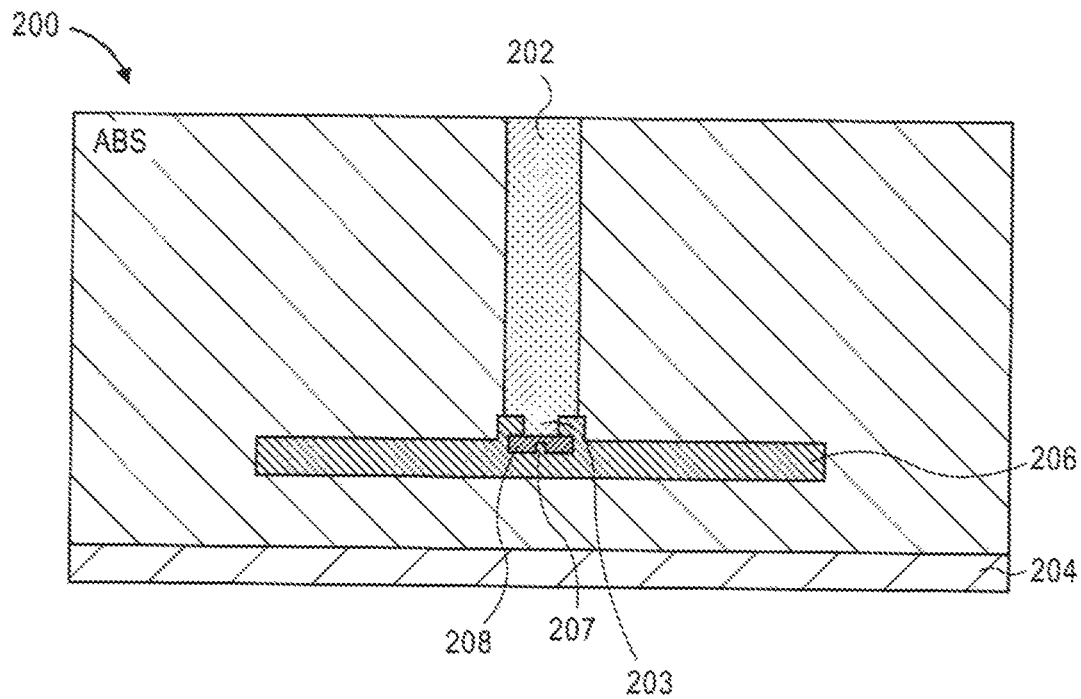
FIG. 2 is an air bearing surface (ABS) view illustrating a near-field transducer (NFT) for a heat-assisted magnetic recording (HAMR) head, according to an embodiment.

FIG. 2 is an air bearing surface (ABS) view illustrating a near-field transducer configuration for a heat-assisted magnetic recording head, according to an embodiment. With reference to FIG. 2, a heat-assisted magnetic recording (HAMR) head 200 is described, which may be incorporated into a head such as head 110*a* (FIG. 1). The HAMR head comprises a write pole 202 and a magnetic return pole (not entirely visible) that both extend to the ABS. The write pole 202 may comprise a write pole lip 203, and the return pole may comprise a return pole pedestal 204, both also at the ABS. As depicted, the return pole pedestal 204 may have a cross section at the ABS that is larger than the cross section of the write pole 202 at the ABS. The write pole 202 can be connected with a shaping layer in a region removed from the ABS. A magnetic back gap layer connects the shaping layer with the return pole in a region removed from the ABS, thereby magnetically connecting the write pole 202 with the return pole and shaping layer in a region removed from the ABS. The write pole 202, the return pole pedestal 204, shaping layer and back gap are all constructed of a magnetic material, such as CoNiFe, NiFe or CoFe.

In view of the head being a HAMR head, the HAMR head 200 comprises a heating assembly that can be provided adjacent to the write pole 202 for locally heating the magnetic medium 120 (FIG. 1). For example, a plasmonic heating device may be implemented for the heating assembly. Thus, according to an embodiment, the heating assembly comprises an optical energy source (or "heat source"), such as a semiconductor laser mounted on or near the backside (opposite the ABS) of the head slider. The heating assembly further comprises a near-field transducer (NFT) for concentrating the optical energy to a nanometer-sized spot to locally heat the magnetic medium 120 in a region just upstream from the write pole 202. Further, the heating assembly typically comprises a waveguide to guide, transmit or carry the optical energy to the ABS, to illuminate the NFT.

This localized heating of the magnetic medium 120 (FIG. 1) momentarily reduces the local coercivity of the magnetic medium 120, which greatly facilitates writing to a magnetic medium 120 which otherwise has too high a coercivity to be written to. In order for the heating assembly to function effectively, it should be located as close as possible to the write pole 202. In addition, the heating assembly should heat only a very small area on the media in order to avoid demagnetizing adjacent tracks of data or downstream data on the same track.

According to an embodiment, the NFT comprises an E-antenna 206 (or c-aperture), in which the dielectric aperture in such a structure looks like the letter "c", while the metal surrounding that dielectric forms an antenna in the shape of a capital letter "E". As such, the HAMR head 200 comprises an aperture 208 and the E-antenna 206 comprises a tip 207 (at times also referred to as the "notch"), whose dimensions in part determine the near-field spot size, i.e., the size of the localized heating of the magnetic medium 120 (FIG. 1). The E-antenna 206 and the aperture 208 may collectively form what is referred to as the near field transducer (NFT). The E-antenna 206, when illuminated by light, excites a charge oscillation called a plasmon within the antenna. The charges concentrated at the edge of the antenna generate a localized higher intensity optical near-field. The optical near-field is electromagnetically coupled to the magnetic medium 120 locally creating a high frequency current (e.g., at an optical frequency). The resistive losses associated with this current are converted to heat, raising the local temperature in the medium 120. In operation, the NFT generates heat not only at the media but also at the NFT. Therefore, it is typical to provide a heat sink structure, such as a heat sink 210 and the lateral "wings" of E-antenna 206 outside of the area of aperture 208, to direct some of the heat away from the write pole lip 203 and the tip 207, for convection away from the slider at the ABS.

Certain approaches to fabricating a c-aperture or E-antenna plasmonic NFT are described in U.S. Pat. No. 8,092,704 to Balamane et al., the entire content of which is incorporated by reference in its entirety for all purposes as if fully set forth herein.

Introduction

NFT reliability may be affected by material build-up (aka "smear") at the head-disk interface (HDI), which can completely bridge the clearance between the head slider and the disk. In a HAMR disk drive, excessive heating of the NFT is a common failure mode, whereby the NFT notch (or tip) rounds and adversely affects the recording performance.

One possible cause of failure is the transfer of heat from the hot spot in the disk to the NFT via the material build-up at the interface. The smear build-up appears to begin at the notch of the NFT and is found to increase with HAMR operation. While the exact cause of the smear is still in question, it is believed that the high heat generated by a HAMR head has the effect of burning contaminants (including, e.g., airborne contaminants) and leaving associated debris remaining in the form of smear. In addition to facilitating the transfer of heat from the disk to the head slider via the material "bridge", the presence of material build-up at the HDI has an undesirable effect on the head-disk spacing, which is a critical operational parameter in HDDs, as well as on head servoing, due to the transfer of disk vibrations to the slider via the material bridge.

HAMR NFTs are typically composed of gold metal, with the notch being configured on the order of a few hundred nanometers by a few hundred nanometers. Therefore, it is a significant challenge to detect and mitigate smear build-up prior to it accumulating to an extent that has a deleterious affect on the NFT. Absent a solution for completely avoiding the generation and accumulation of smear, a suitable and precise smear detection procedure is a viable approach, in furtherance of early detection of the presence of smear before it is allowed to accumulate and spread uncontrollably, especially to an extent at which the smear is not readily burnished from the slider. However, known techniques for disk contact detection which utilize a thermal fly height control (TFC) system have a precision on the order of tens of microns, based generally on the size of the slider bulge generated by the TFC system. Hence, it can be appreciated that there currently exists a mismatch between the precision of TFC-based disk contact detection techniques and the precision desired for early detection of smear on the NFT notch. It therefore follows that increasing the sensitivity of disk contact sensing techniques could play a role in early detection of smear before the smear is allowed to build up at the NFT notch.

Thermal Fly-Height Control

As areal density increases, the read-write head generally needs to fly closer and closer to the disk surface. Fly height (also, "flying height") control systems are often used to fly the read-write head as close as possible to the magnetic-recording disk for effective operation of the head. For example, a heater element located in the head slider is typically used for thermal fly-height control (TFC), which may be controlled, for example, by a preamplifier associated with the hard disk drive head stack assembly. By applying current to the heater, the surrounding slider material is caused to expand in response to the heat, which causes a bulge in the slider toward the disk, thereby reducing the fly height of the read-write head. TFC may be used to compensate for fly height fluctuations due to temperature, altitude, disk location, type of operation, and the like. Particularly during read operations, the heater causes the reader to be closer to the disk to increase the signal strength of the read-back signal read from the magnetic disk. Additionally, the heater may be used to cause the writer to be closer to the disk to increase the robustness of the magnetization written to the disk.

In the context of calibrating a TFC system (i.e., setting a preferred slider fly height), TFC systems gently urge the head area of the slider toward the disk until contact is made ("touchdown"), at which point the slider is urged away from the disk ("back-off", or "pull-back"). Touchdown and back-off are effectuated by, respectively, (1) providing electrical current to the TFC heater element, which causes the surrounding slider materials to expand and protrude outward closer to the disk, and then (2) slightly reducing the current to the heater element to cause the surrounding slider materials to contract away from the direction of the disk. The back-off fly height is then typically used as the preferred (i.e., baseline, or neutral) fly height for operation of the HDD.

In HDD systems having an embedded contact sensor (ECS), the ECS is often used to sense the touchdown event. Resistor temperature detector (RTD) systems are at times used to determine when the head slider makes physical contact with the magnetic-recording disk based upon the temperature of an element, such as an ECS element, embedded in the slider near the read-write head. An ECS element typically takes the form of a metallic strip, and senses physical contact of the slider with the disk based on the ECS element's resistance, e.g., the amount of voltage across the element, which is affected by the temperature change caused by such physical contact. Hence, the resistance of the ECS can be used to determine touchdown, based on the slider temperature suddenly increasing due to frictional heating associated with the disk contact event.

Detecting Contamination at the Head-Disk Interface of a Hard Disk Drive

Figure 3:
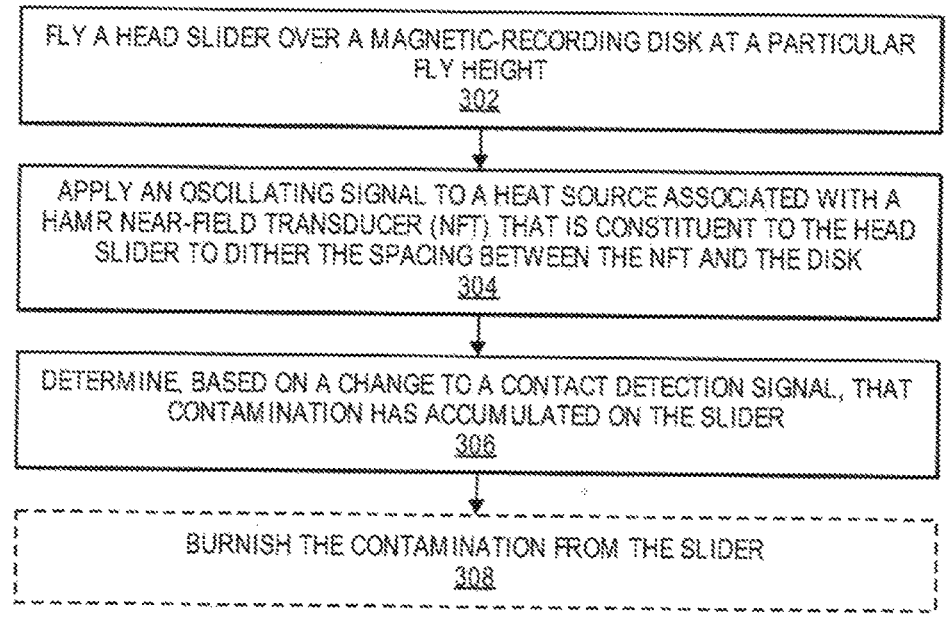
FIG. 3 is a flow diagram illustrating a method for detecting contamination at a head-disk interface in a HAMR HDD, according to an embodiment.

FIG. 3 is a flow diagram illustrating a method for detecting contamination at a head-disk interface in a HAMR HDD, according to an embodiment. The method depicted in FIG. 3 may be implemented as one or more sequences of instructions stored in a memory, for execution by one or more processors. However, the manner in which the logic is implemented may vary from implementation to implementation. For non-limiting examples, the one or more sequences of instructions may be implemented as firmware stored in ROM or in hardware circuitry. Furthermore, the processing may be implemented for operation in an electronic component, for non-limiting examples, an HDD pre-amplifier, hard disk controller electronics, read-channel electronics, write-channel electronics, a system-on-a-chip (SOC) integrating one or more of the foregoing, and the like. The manner in which the executing electronics are configured may vary from implementation to implementation. Therefore, the memory in which the one or more sequences of instructions are stored, and the one or more processors which execute the instructions, may both/all reside on a single electronic component, e.g., an integrated circuit board, or may reside on separate electronic components or otherwise separately.

Figure 4:
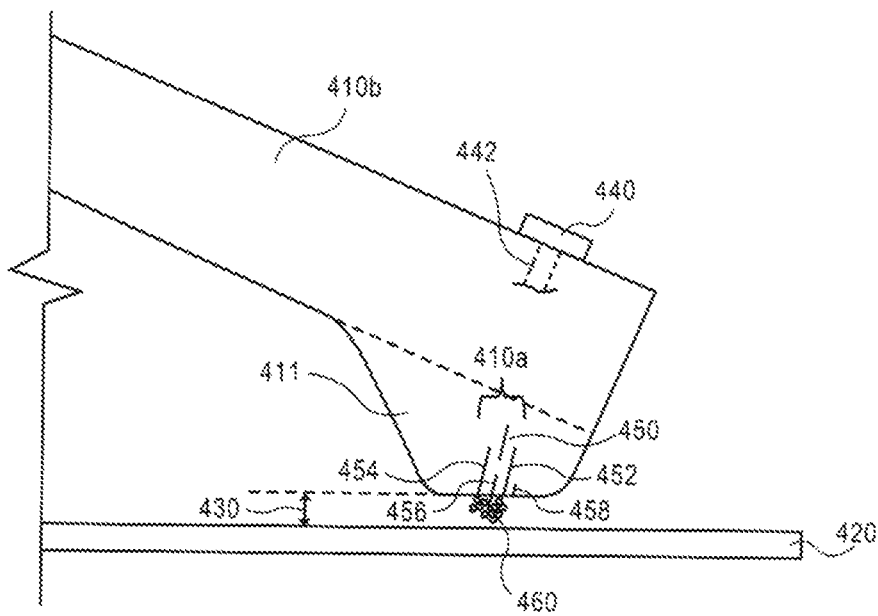
FIG. 4 is a side view schematic illustrating a head-disk interface, according to an embodiment.

FIG. 4 is a side view schematic illustrating a head-disk interface, according to an embodiment, and is informative in understanding the method of FIG. 3. With reference to FIG. 4, illustrated is a head-disk interface (HDI) associated with a slider 410b and a disk medium 420. The slider 410b is depicted as having a thermal fly height control (TFC) bulge 411 in the area of the read-write head 410a, which is generated by applying current to a TFC heater 450. The read-write head 410a comprises a writer 452 and a reader 454, as well as a HAMR NFT 456. The TFC heater 450 and an embedded contact sensor (ECS) 458 are also illustrated in FIG. 4, and may (or may not) be considered part of the read-write head 410a. Mounted on the slider 410b is a HAMR heat source 440, which provides the heat to the NFT 456 via a waveguide 442 running through the slider 410*b*, in order to actuate the plasmonic activity corresponding to the NFT 456.

As discussed, TFC systems are used to control the fly height of the read-write head 410*a* over the disk medium 420 at any given time by managing the size of the slider bulge 411 in order to fly the read-write head 410*a* as close as possible or desirable to the disk medium 420 for effective operation of the head. Furthermore, a TFC system needs to be calibrated in order to understand how much power should be applied to the TFC heater 450 in order to achieve the desired fly height, which typically involves the "touchdown" and "back-off" procedure described elsewhere herein. The desired fly height with TFC applied is depicted in FIG. 4 as the TFC fly height 430 corresponding to the desired "back-off" distance, which has associated touchdown power ("TDP") and back-off power levels.

With reference now also to FIG. 3, at block 302, a head slider is flown over a magnetic-recording disk at a particular fly height. For example, head slider 410*b*, which includes a magnetic read-write head 410*a*, is flown over disk medium 420 at a TFC fly height 430 from the disk medium 420.

At block 304, an oscillating signal is applied to a heat source associated with a HAMR near-field transducer (NFT) that is constituent to the head slider, to dither the spacing between the NFT and the magnetic-recording disk. For example, an alternating current (AC) is applied over a direct current (DC) to the HAMR heat source 440 associated with the NFT 456 of the head slider 410*b*. According to an embodiment, the heat source is a laser, such as a semiconductor laser. Application of an oscillating signal to the heat source 440 causes the heat source 440 to pulse energy (e.g., optical energy in the case of a laser) to the NFT 456. This pulsing energy causes the NFT 456 (i.e., namely the metal E-antenna 206 of FIG. 2) to relatively rapidly expand and contract in response to the heat pulsing, which in turn causes dithering of the NFT (i.e., cyclically protruding and retracting from the surface of the slider) and, likewise, dithering of the spacing between the slider 410*b* and the disk medium 420. Thus, there is some point, along an application of increasing current to the heat source 440, at which the NFT 456 becomes the minimum fly point because of its expansion/protrusion resulting from the application of heat from the heat source 440.

At block 306, based on a change to a contact detection signal, it is determined that contamination has accumulated on the slider. According to an embodiment, the contact detection signal corresponds to the embedded contact sensor (ECS) 458, and represents contact between the disk medium 420 and accumulated contamination 460 (FIG. 4). However, the contact detection sensor and corresponding contact detection signal used to monitor NFT (contamination)-to-disk contact may vary from implementation to implementation and, therefore, practice of embodiments is not limited to using an ECS signal as the contact detection signal. For non-limiting examples, signals from other elements within the slider may be used (e.g., from the reader 454), as well from elements external to the slider (e.g., spindle 124 (FIG. 1) drive motor current), and the like, as contact between a contaminated NFT 456 and the disk medium 420 may propagate through and manifest in a signal from any number of HDD components, which therefore may be employed as contact detection sensors.

This contact detection signal can be monitored for such an increase in amplitude which, when sufficiently large, can be utilized to logically conclude or determine (at block 306) that contamination, or smear, has accumulated on the head slider 410*b* at or near the NFT 456. According to an embodiment, the act of determining at block 306 includes determining that the contamination has accumulated on or over the NFT 456.

A head slider, such as head slider 410*b*, is essentially a cantilevered body having at least one natural frequency in each of multiple axes. Hence, direct or indirect contact between the head slider 410*b* and the surface of the disk medium 420 can cause the head slider to vibrate at a natural (i.e., a resonant) frequency, thereby increasing the amplitude of a contact detection signal at and around such resonant frequency. Furthermore, slider elements that are used to sense contact detection are typically configured or calibrated to be receptive and sensitive to a signal frequency range that includes at least one of the head slider natural frequencies.

According to an embodiment, the oscillating signal that is applied to the heat source 440 associated with the NFT 456 (at block 304) is a signal having a frequency at or near a particular natural frequency of the head slider 410*b*. Consequently, while dithering, the NFT 456 will oscillate (i.e., protrude and retract) at or near the applied particular natural frequency of the head slider 410*b*. Therefore, when the accumulated contamination 460 that is mechanically coupled with the NFT 456 contacts the surface of the disk medium 420, because the contact detection sensor is sensitive to this natural frequency, the corresponding contact detection signal will experience a resultant increase in amplitude at or near this natural frequency.

Figure 5:
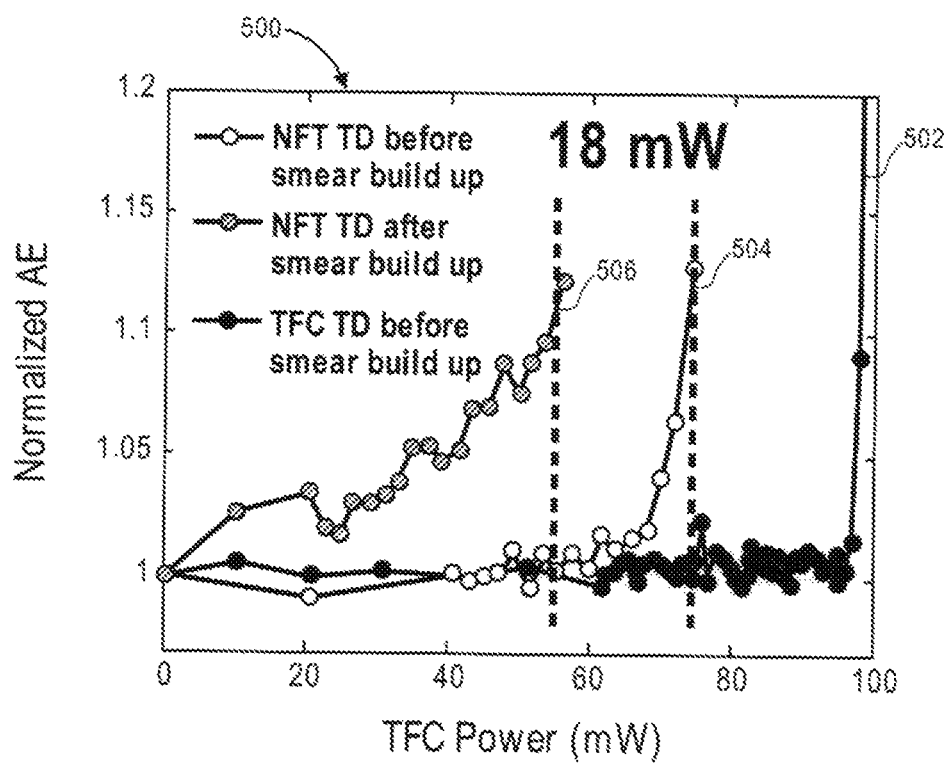
FIG. 5 is a data graph illustrating a signal change associated with material build-up on an NFT, according to an embodiment.

FIG. 5 is a data graph illustrating a signal change associated with material build-up on an NFT, according to an embodiment. The data graph 500 illustrates multiple signals representing TFC power (x-axis) versus a normalized value (y-axis), which is referred to as a "contact detection signal". With reference also to FIG. 4, signal 502 represents a typical TFC scenario in which the TFC contact detection sensor (e.g., ECS 458) is at or near the minimum fly point on the head slider 410*b*. Thus, as increasing current (i.e., power) is applied to the TFC heater element 450, at some point (at around 98 mW as shown here) the slider touchdown (TD) occurs and the contact detection signal 502 represents this touchdown experienced by the head slider 410*b* contacting the disk medium 420, where this representation manifests in the signal spike around 98 mW.

Signal 504 represents a scenario, according to an embodiment, in which enough power is being applied to the NFT 456 heat source 440 such that the NFT 456 is the minimum fly point on the head slider 410*b*. Thus, as increasing current (i.e., power) is applied to the TFC heater 450, at some point (at around 70 mW as shown here) the slider touchdown occurs at the NFT 456 and the contact detection signal 504 represents this touchdown experienced by the NFT 456 contacting the disk medium 420, where this representation manifests in the signal spike beginning around 70 mW. Thus, signal 504 represents an NFT 456 touchdown before material (e.g., smear contamination) has built up on the head slider 410*b*/NFT 456.

Similarly, according to an embodiment, signal 506 represents another scenario in which enough power is being applied to the NFT 456 heat source 440 such that the NFT 456 is the minimum fly point on the head slider 410*b*. In fact, accumulated contamination 460 is the minimum fly point on the head slider 410*b* according to signal 506. Thus, as increasing current (i.e., power) is applied to the TFC heater 450, at some point a touchdown occurs and the contact detection signal 506 represents this touchdown experienced by the NFT 456/contamination 460 contacting the disk medium 420. This representation manifests in the change to the contact detection signal, where the signal 506 represents an NFT 456 touchdown after material (e.g., smear contamination 460) has built up on the head slider 410*b*/NFT 456, as compared to the signal 504 that represents the NFT 456 touchdown before material build-up. Hence, the difference between signal 504 and signal 506 (approximately 18 mW as shown here) can be attributed to an "earlier" (less TFC power at TD) touchdown between the NFT 456 and the disk medium 420, caused by the accumulation of contamination 460 on the head slider 410*b*/NFT 456.

While the data graph 500 represents a scenario in which TFC power is increasingly applied to the TFC heater 450, according to an embodiment, the method for detecting contamination at a head-disk interface in a HAMR HDD illustrated and described in reference to FIG. 3 may be implemented with zero application of TFC power, or with back-off TFC power applied, while increasing and/or dithering the current (i.e., power) to the NFT 456 heat source 440. However, it would be preferable to implement such a procedure for detecting contamination at a head-disk interface in a HAMR HDD while the head slider 410*b* is flying over the disk medium 420 at the relatively stable "back-off" power and corresponding distance, while increasing the current to either the TFC heater 450 and/or the NFT 456 heat source 440 until touchdown occurs.

Thus, without intentionally contacting the NFT 456 with the disk medium 420, one could dither the NFT 456 as described (e.g., at block 304) until a significant enough change in the touchdown power (TDP) occurs (e.g., signals 504 and 506 as depicted in data graph 500 of FIG. 5), and at a level below the typical TDP (e.g., signal 502), at which point the contamination accumulation determination (e.g., at block 306) may be made. Stated otherwise, the particular fly height at which the head slider 410*b* is flown over the disk medium 420 (e.g., at block 302) may correspond to a particular back-off TFC power relative to a corresponding TFC TDP (e.g., signal 502), and such a change to the signal represents a difference between the TFC TDP and a real-time TFC power (e.g., signal 504 and signal 506).

The data graph 500 is intended to represent a scenario in which the NFT 456 is dithered by applying an oscillating signal to the NFT heat source 440 (e.g., at block 304 of FIG. 3). The oscillating signal, at a point at which the contact detection signal changes, corresponds to a real-time TFC power. Thus, according to an embodiment, the extent that the contamination 460 has accumulated is computed based on the difference between a known NFT 456 touchdown power and the real-time TFC power (e.g., the 18 mW noted in FIG. 5). This can be accomplished because, as in most cases, the correlation between HDI spacing (i.e., fly height) and TFC power levels has already been established and recorded. Hence, a TFC power delta can be equated to a distance, such as the accumulated thickness of contamination 460.

Furthermore, such amplitude modulation applied to the NFT 456 protrusion effectively increases the contact detection sensitivity of the system. As discussed, the size of the NFT 456 may be roughly on the order of a few hundred nanometers by a few hundred nanometers. According to an embodiment, because dithering of the NFT 456 is utilized to ensure that the NFT 456 is the minimum fly point of the head slider 410*b*, the precision of the determining action (block 306) is effectively on the same order of magnitude, i.e., on the order of a few hundred nanometers by a few hundred nanometers. Consequently, material build-up on the NFT 456 in the form of smear contamination can be detected early, before the material has an opportunity to accumulate to the point of read-write head 410*a* (FIG. 4) failure.

With reference back to FIG. 3, according to an embodiment, at optional block 308, the contamination is burnished from the slider. For example, head slider 410*b* (FIG. 4) is brought into contact with disk medium 420 (FIG. 4) for a sufficient duration to burnish the contamination 460 (FIG. 4) off of the head slider 410*b*. The manner in which the head slider 410*b* is intentionally made to contact the surface of the disk medium 420 may vary from implementation to implementation.

According to an embodiment, a voltage is applied between the head slider 410*b* and the disk medium 420 to bring the head slider 410*b* into contact with the disk medium 420 by way of electrostatic attraction, and thereby burnish the contamination 460 from the head slider 410*b*. For example, an AC interface voltage (IV) source may apply an AC voltage at the HDI, i.e., between the slider 410*b* and the disk medium 420 (a technique at times referred to as interface voltage control (IVC)), for a suitable duration sufficient to generate continuous contact between the head slider 410*b* and the disk 420. How the differential signal is applied to the HDI may vary from implementation to implementation, e.g., a signal could be applied in a certain manner to the slider 410*b* and/or in a certain manner to the disk medium 420.

According to an embodiment, a particular power signal is applied to the TFC heater 450 of the head slider 410*b* to bring the head slider 410*b* into contact with the disk medium 420, and thereby burnish the contamination 460 from the head slider 410*b*. For example, the known touchdown power (TDP) may be applied to the TFC heater 450 for a suitable duration sufficient to generate continuous contact between the head slider 410*b* and the disk 420.

Similarly, a suitable signal may be applied to the NFT 456 heat source 440 for a suitable duration to facilitate contact between the NFT 456 and the disk medium 420, and/or a suitable signal may be applied to the writer 452 for a suitable duration to facilitate contact between the writer 452 and the disk medium 420, to thereby burnish the contamination 460 from the head slider 410*b*.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for detecting contamination at a head-disk interface (HDI) in a heat-assisted magnetic recording (HAMR) hard disk drive (HDD), the method comprising:
   flying a head slider over a magnetic-recording disk at a particular fly height;
   applying an oscillating signal to a heat source associated with a HAMR near-field transducer (NFT) that is constituent to said head slider to dither the spacing between said NFT and said disk; and
   determining, based on a change to a contact detection signal, that contamination has accumulated on said head slider.

2. The method of claim 1, further comprising:
   burnishing said contamination from said head slider.

3. The method of claim 2, wherein said burnishing includes applying a voltage between said head slider and said disk to bring said head slider into contact with said disk.

4. The method of claim 2, wherein said burnishing includes applying a particular power signal to a thermal fly height control (TFC) heater element to bring said head slider into contact with said disk.

5. The method of claim 1, wherein said determining includes determining that said contamination has accumulated on said NFT.

6. The method of claim 1, wherein said contact detection signal corresponds to a real-time TFC power with said oscillating signal applied, and wherein said determining includes comparing said contact detection signal with a known TFC power corresponding to an NFT touchdown without contamination accumulation.

7. The method of claim 6, further comprising:
   computing an extent of said contamination based on a difference between said contact detection signal and said known TFC power.

8. The method of claim 1, wherein said contamination is generated, at least in part, based on heat generated by said heat source during operation.

9. The method of claim 1, wherein a part of said NFT that changes shape in response to applying said oscillating signal to said heat source is dimensioned on the order of a few hundred nanometers by a few hundred nanometers, and thereby said determining has a precision on the same order of a few hundred nanometers by a few hundred nanometers.

10. The method of claim 1, wherein said applying includes applying said oscillating signal at a natural frequency of said head slider.

11. A hard disk drive (HDD) comprising:
    a disk medium rotatably mounted on a spindle;
    a head slider comprising a read-write head configured to read from and to write to said disk medium;
    a voice coil actuator configured to move said head slider to access portions of said disk medium; and
    a least one electronic component comprising a memory, one or more processors, and one or more sequences of instructions which, when executed by said one or more processors, cause performance of:
        flying a head slider over said disk medium at a particular fly height,
        applying an oscillating signal to a heat source associated with a heat-assisted magnetic recording (HAMR) near-field transducer (NFT) that is constituent to said head slider to dither the spacing between said NFT and said medium disk, and
        determining, based on a change to a contact detection signal, that contamination has accumulated on said head slider.

12. The hard disk drive of claim 11, wherein said one or more sequences of instructions, when executed, further cause performance of:
    burnishing said contamination from said head slider.

13. The hard disk drive of claim 12, wherein said burnishing includes applying a voltage between said head slider and said disk medium to bring said head slider into contact with said disk medium.

14. The hard disk drive of claim 12, wherein said burnishing includes applying a particular power signal to a thermal fly height control (TFC) heater element to bring said head slider into contact with said disk medium.

15. The hard disk drive of claim 11, wherein said determining includes determining that said contamination has accumulated on said NFT.

16. The hard disk drive of claim 11, wherein said contact detection signal corresponds to a real-time TFC power with said oscillating signal applied, and wherein said determining includes comparing said contact detection signal with a known TFC power corresponding to an NFT touchdown without contamination accumulation.

17. The hard disk drive of claim 16, wherein said one or more sequences of instructions, when executed, further cause performance of:
    computing an extent of said contamination based on a difference between said contact detection signal and said known TFC power.

18. An electronic component comprising:
    a memory;
    one or more processors; and
    one or more sequences of instructions in said memory and which, when executed by said one or more processors, cause performance of:
        flying a head slider over a magnetic-recording disk at a particular fly height,
        applying an oscillating signal to a heat source associated with a heat-assisted magnetic recording (HAMR) near-field transducer (NFT) that is constituent to said head slider to dither the spacing between said NFT and said disk, and
        determining, based on a change to a contact detection signal, that contamination has accumulated on said head slider.

19. The electronic component of claim 18, wherein said one or more sequences of instructions, when executed, further cause performance of:
    burnishing said contamination from said head slider.

20. The electronic component of claim 18, wherein said determining includes determining that said contamination has accumulated on said NFT.

* * * * *

UNITED STATES PATENT AND TRADEMARK OFFICE
CERTIFICATE OF CORRECTION

PATENT NO. : 9,601,140 B1
APPLICATION NO. : 15/160945
DATED : March 21, 2017
INVENTOR(S) : Rajauria Page 1 of 1

It is certified that error appears in the above-identified patent and that said Letters Patent is hereby corrected as shown below:

In the Claims

Column 13, beginning on Line 43, Claim 9 replace the text "wherein a part of said NET" with "wherein a part of said NFT".

Column 14, beginning on Line 7, Claim 11 replace the text "between said NET and said disk medium" with "between said NFT and said disk medium".

Column 14, beginning on Line 48, Claim 18 replace the text "between said NET and said disk" with "between said NFT and said disk".

Signed and Sealed this
First Day of May, 2018

Andrei Iancu
*Director of the United States Patent and Trademark Office*